(12) United States Patent
Weber et al.

(10) Patent No.: US 8,595,313 B2
(45) Date of Patent: Nov. 26, 2013

(54) SYSTEMS AND METHOD FOR SIMPLE SCALE-OUT STORAGE CLUSTERS

(75) Inventors: Bret S. Weber, Wichita, KS (US); Mohamad H. El-Batal, Westminster, CO (US); William P. Delaney, Wichita, KS (US)

(73) Assignee: NetApp. Inc., Sunnyvale, CA (US)

( * ) Notice: Subject to any disclaimer, the term of this patent is extended or adjusted under 35 U.S.C. 154(b) by 2432 days.

(21) Appl. No.: 11/289,140

(22) Filed: Nov. 29, 2005

(65) Prior Publication Data

US 2007/0124407 A1 May 31, 2007

(51) Int. Cl.
*G06F 15/167* (2006.01)
(52) U.S. Cl.
USPC .......................................... 709/212; 709/214
(58) Field of Classification Search
USPC .......................................................... 709/212
See application file for complete search history.

(56) References Cited

U.S. PATENT DOCUMENTS

| | | | |
|---|---|---|---|
| 6,073,218 A | 6/2000 | DeKoning et al. | |
| 6,173,374 B1 | 1/2001 | Heil et al. | |
| 6,732,104 B1 * | 5/2004 | Weber | 707/10 |
| 6,820,171 B1 * | 11/2004 | Weber et al. | 711/114 |
| 7,376,755 B2 * | 5/2008 | Pandya | 709/250 |
| 2003/0065733 A1* | 4/2003 | Pecone | 709/211 |
| 2003/0131068 A1* | 7/2003 | Hoshino et al. | 709/216 |
| 2004/0122987 A1 | 6/2004 | Henry et al. | |
| 2004/0123017 A1 | 6/2004 | Henry et al. | |
| 2005/0071546 A1 | 3/2005 | Delaney et al. | |

\* cited by examiner

*Primary Examiner* — Afshawn Towfighi
(74) *Attorney, Agent, or Firm* — Haynes and Boone, LLP

(57) ABSTRACT

Systems and associated methods for flexible scalability of storage systems. In one aspect, a storage controller may include an interface to a fabric adapted to permit each storage controller coupled to the fabric to directly access memory mapped components of all other storage controllers coupled to the fabric. The CPU and other master device circuits within a storage controller may directly address memory an I/O devices directly coupled thereto within the same storage controller and may use RDMA features to directly address memory an I/O devices of other storage controllers through the fabric interface.

16 Claims, 7 Drawing Sheets

SYSTEMS AND METHOD FOR SIMPLE SCALE-OUT STORAGE CLUSTERS

BACKGROUND OF THE INVENTION

1. Field of the Invention

The invention relates generally to storage clusters and more specifically to systems and methods for simpler, low-cost scale-out storage cluster configurations.

2. Related Patents

This patent application is related to co-pending, commonly owned U.S. patent application Ser. No. 10/329,184 (filed Dec. 23, 2002; the "'184 application" now published as Publication No. 2004/0123017), U.S. patent application Ser. No. 10/328,672 (filed Dec. 23, 2002; now published as Publication No. 2004/0122987), and U.S. patent application Ser. No. 10/671,158 (filed Sep. 25, 2003; now published as Publication No. 2005/0071546), all of which are hereby incorporated by reference. Additionally, U.S. Pat. No. 6,173,374 (issued Jan. 9, 2001) and U.S. Pat. No. 6,073,218 (issued Jun. 6, 2000) provide useful background information and are hereby incorporated by reference.

3. Discussion of Related Art

A mass storage system is used for storing user and system data in data processing applications. A typical mass storage system includes a plurality of computer disk drives configured for cooperatively storing data as a single logically contiguous storage space often referred to as a volume or logical unit. One or more such volumes or logical units may be configured in a storage system. The storage system, therefore, performs much like that of a single computer disk drive when viewed by a host computer system. For example, the host computer system can access data of the storage system much like it would access data of a single internal disk drive, in essence, oblivious to the substantially transparent underlying control of the storage system.

Mass storage systems may employ Redundant Array of Independent Disks ("RAID") management techniques, such as those described in "A Case For Redundant Arrays Of Inexpensive Disks", David A. Patterson et al., 1987 ("Patterson"). RAID levels exist in a variety of standard geometries, many of which are defined by Patterson. For example, the simplest array, a RAID level 1 system, comprises one or more disks for storing data and an equal number of additional "mirror" disks for storing copies of the information written to the data disks. Other RAID management techniques, such as those used in RAID level 2, 3, 4, 5, 6 and 10 systems, segment or stripe the data into portions for storage across several data disks, with one or more additional disks utilized to store error check or parity information.

Regardless of storage management techniques, a mass storage system may include one or more storage modules with each individual storage module comprising a plurality of disk drives coupled to one or more storage controllers. In one typical configuration, a storage module may be coupled through its storage controller(s) directly to a host system as a stand-alone storage module. Typical storage controllers include significant cache memory capacity to improve performance of the I/O operation. Write requests may be completed when the supplied data is written to the higher speed cache memory. At some later point, the data in cache memory may be flushed or posted to the persistent storage of the storage modules. Also, read requests may often be satisfied by accessing data already resident in the higher speed cache memory of the storage controller.

Such direct coupling of a storage system to a host system may utilize any of numerous communication media and protocols. Parallel SCSI buses are common for such direct coupling of a storage system to a host. Fibre Channel and other high speed serial communication media are also common in high performance environments where the enterprise may require greater physical distance for coupling between the storage systems and the host systems.

Even in a standalone configuration, it is common to enhance reliability and performance by providing a redundant pair of storage controllers. The redundant pair of controllers enhances reliability in that an inactive storage controller may assume control when the active controller is sensed to have failed in some manner. The redundant pair of storage controller may also enhance performance of the standalone storage system in that both storage controller may be active—each acting as backup for the other while both simultaneously processing different I/O requests or different portions of an I/O request.

In such a configuration with redundant storage controllers, the storage controllers typically exchange information to maintain coherency of data between the cache memories resident in each controller. Some prior storage systems use the communication path between the controllers and the storage modules for the additional cache coherency information exchanges. However, such shared use of this communication path for interaction between the controller and the storage modules and for cache coherency exchanges between the storage controllers can negatively impact storage system performance. Some prior techniques have therefore provided a dedicated bus or channel coupled between the redundant pair of storage controllers and intended primarily for such cache coherency exchanges. Such a bus or dedicated communication channel is typically adapted well for simple, fast, point-to-point exchanges between the paired redundant storage controllers.

In another standard configuration, the storage module may be part of a larger storage network or cluster. In a storage network/cluster architecture, a plurality of storage modules and corresponding storage controller are typically coupled through a switched network communication medium (i.e., a fabric) to one or more host systems. This form of a multiple storage module system is often referred to as a Storage Area Network ("SAN") architecture and the switching fabric is, therefore, often referred to as an SAN switching fabric. In such a clustered configuration it is common that all of the storage controllers exchange coherency information as well as other information for load balancing of I/O request processing and other control information. Such control information may be exchanged over the same network fabric that couples the storage controllers to the host systems (often referred to as the "front end" connection or fabric) or over another fabric that couples the storage controllers to the storage modules (often referred to as the "back-end" connection or fabric). Though such a fabric connection allows scalability of the storage controllers, use of the existing front end or back-end fabric may negatively impact overall storage system performance.

The differences between a stand-alone storage system and a storage network architecture are marked. In a stand-alone storage module system, a host computer system will directly send Input/Output ("I/O") requests to the storage controller (s) of the storage module. The storage controller receiving the request, in general, completely processes the received I/O requests to access data stored within the disk drives of the storage module. The storage controller then identifies and accesses physical storage spaces by identifying and accessing particular logical unit numbers ("LUNs" often also referred as "volumes" or "logical volumes") within one or more of the disk drives of the storage module. Via the storage controller, the host computer system can then read data from the storage spaces or write data to the physical storage spaces.

By way of contrast, in a multiple storage module configuration (i.e., networked storage or storage cluster), the various LUNs or even a single LUN can be spread across one or more storage modules of the storage system. In such a multiple module storage system the switching fabric may be used to effectuate communication between the storage controllers of one or more storage modules (e.g., via the back-end fabric) as well as between the storage controllers and the host systems (e.g., via the front end fabric). A host computer may communicate an I/O request to the storage system and, unbeknownst to the host system, the I/O request may be directed through the switching fabric to any storage controller of any of the storage modules. The storage controllers of multiple storage modules may require communications for exchange of cache coherency information and to coordinate and share information regarding LUNs that are distributed over multiple storage modules. Information returned by the storage controllers is routed back through the switched fabric to the requesting host system.

For any of several reasons, an enterprise may wish to change from a direct coupled storage module to a storage network/cluster architecture for coupling storage modules to host systems. For example, a network/cluster architecture may allow for increased available communication bandwidth where multiple host communication links may be available between the networked complex of storage modules and one or more host systems. Another potential benefit of a network/cluster storage architecture derives from the increased storage performance realized by the cooperative processing of multiple storage controllers that are interconnected to share the workload of requested I/O operations. Another possible reason for an enterprise to convert to a storage network/cluster architecture is to increase storage capacity beyond the capacity of a single, stand-alone storage module. The above-mentioned benefits and reasons may hereinafter be collectively referred to as storage performance features.

Any particular storage module has a finite storage capacity because, for example, a storage module has a finite physical area in which the disk drives may be placed. In addition, performance of the storage module may be limited to a number of possible controllers that may be configured within a stand-alone storage module for processing of host system I/O requests. Alternatively, a storage module may have a limit on the number of direct host communication links and hence a limit on the available bandwidth for communicating between the storage subsystem and host systems. Accordingly, when an organization requires improved performance features from its storage system, the organization may implement a new storage system designed with multiple storage modules in a storage network architecture to provide additional storage capacity and/or performance to overcome the limitations of a single stand-alone storage module.

Since a stand-alone storage module has a controller configured for direct access by a host computer system but typically not for cooperation and coordination with other controllers of other storage modules, implementation of a new multiple storage module networked storage system may include replacement of the storage controller(s) of the stand-alone storage module(s). Different storage controllers may be required to provide the required interconnection between storage controllers of the multiple storage modules to permit desired cooperation and coordination between the multiple storage modules. Such a reconfiguration of the stand-alone storage module is necessary because the storage module may coordinate with other storage modules through an SAN switching fabric not previously required in a stand-alone storage module.

Upgrades to an existing stand-alone storage system to enable networked communications among multiple storage modules remain an expensive process. In addition to possible replacement of storage controllers, retrofitting a present stand-alone storage module to operate as one of a plurality of storage modules in a networked storage system typically requires other components to implement communication between the storage controllers. Costly, complex N-way fabric switches add significant cost for the initial conversion from a stand-alone configuration to a storage network configuration.

Although storage performance feature requirements often grow in an enterprise, the cost for conversion to a networked storage architecture may be prohibitive to smaller enterprises. It is therefore evident that a need exists to provide improved methods and structure for improving storage performance feature scalability to permit cost effective growth of storage as an organization grows.

SUMMARY OF THE INVENTION

The present invention solves the above and other problems, thereby advancing the state of the useful arts, by providing methods and structures that enable flexible scaling of a storage subsystem from a single storage controller, to a redundant pair of mirrored controller and on to a full clustered storage environment with N-way connectivity among any number of controllers in the subsystem. This flexible scalability is provided without imposing significant complexity by providing flexible configuration of any pair of controllers as well as an N-way connection among all controllers through a switched fabric inter-controller connection.

A first feature hereof provides an apparatus within a storage controller for communication among a plurality of storage controllers in a clustered storage system, the apparatus comprising: a local memory mapped interface for access to local cache memory of the storage controller by other components within the storage controller; a fabric communication interface for inter-controller communication between the storage controllers and other storage controllers of the plurality of storage controllers; and a remote memory mapped interface for access to the local cache memory of the storage controller by the other storage controllers, wherein the fabric communication interface is adapted to permit remote DMA ("RDMA") access by the storage controller to local cache memories of the other storage controllers and is further adapted to permit RDMA access to the local cache memory of the storage controller by the other storage controllers.

Another aspect hereof further provides that the local memory map includes: a map portion corresponding to each of the other storage controllers to permit access by the storage controller to the local cache memory of each of the other storage controllers.

Another aspect hereof further provides that each map portion further includes: an I/O map portion corresponding to one or more I/O devices of the corresponding other storage controller to permit RDMA access by the storage controller to the one or more I/O devices of the corresponding other storage controller.

Another aspect hereof further provides that the remote memory map further includes: an I/O map portion corresponding to one or more I/O devices of the storage controller to permit RDMA access by any of the other storage controllers to the one or more I/O devices of the storage controller.

Another aspect hereof further provides that the storage controller performs I/O requests by accessing information from the other storage controllers using the fabric communication interface.

Another aspect hereof further provides that the storage controller maintains cache coherency of local cache memories associated with each of the plurality of storage controllers by exchanging cache coherency information using the fabric communication interface.

Another feature hereof provides a system comprising: a plurality of storage modules; a plurality of storage controllers each adapted for coupling to one or more of the plurality of storage modules and each adapted for coupling to one or more host systems; and an inter-controller communication medium coupling the plurality of storage controllers to one another, wherein each storage controller includes: local cache memory; a back-end interface for coupling the storage controller to the one or more storage modules; a front-end interface for coupling the storage controller to the one or more host systems; and an inter-controller interface for coupling the storage controller to one or more other storage controllers of the system through the inter-controller communication medium, wherein the inter-controller interface permits remote DMA ("RDMA") access between the storage controller and the local cache memory of the one or more other storage controllers and permits RDMA access to local cache memory of the storage controller by the one or more other storage controllers.

Another aspect hereof further provides that the inter-controller communication medium further comprises a parallel bus structure.

Another aspect hereof further provides that the parallel bus structure is a PCI Express bus structure.

Another aspect hereof further provides that the inter-controller communication medium further comprises a fabric communication medium.

Another aspect hereof further provides that the fabric communication medium is an InfiniBand communication medium.

Another aspect hereof further provides that each storage controller further comprises: a first memory map that maps physical addresses within the storage controller for access to the local cache memory, to the back-end interface, and to the front-end interface; and a second memory map that maps physical addresses within the storage controller for RDMA access to local cache memory of the one or more other storage controllers, to front-end interfaces of the one or more other storage controllers, and to the back-interface of the one or more other storage controllers, wherein each storage controller may access the local cache memory, front-end interface, and back-end interface of any storage controller of the plurality of storage controller.

Another aspect hereof further provides that each storage controller is adapted to perform I/O requests received from one or more host systems by accessing information on the other storage controller using the inter-controller interface.

Another aspect hereof further provides that each storage controller is adapted to maintain cache coherency of local cache memories associated with each of the plurality of storage controllers by exchanging cache coherency information using the inter-controller interface and the inter-controller communication medium.

DETAILED DESCRIPTION OF THE DRAWINGS

Figure 1A:
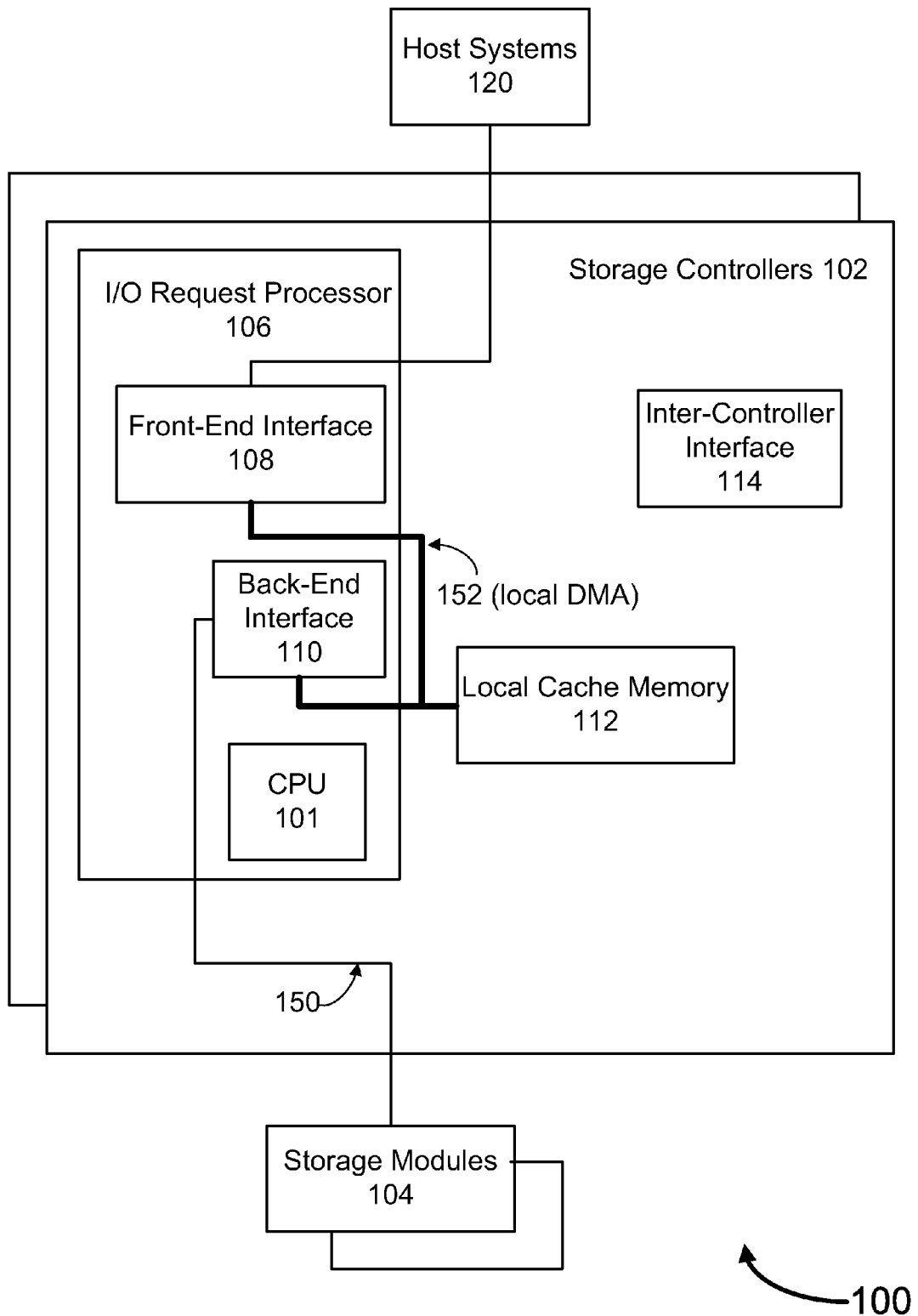
FIGS. 1a through 1c are block diagrams of an exemplary system including a storage controller in accordance with features and aspects hereof to allow flexible scaling of controller through a dedicated inter-controller interface.

FIG. 1a is a block diagram of a system 100 including storage controllers 102 coupled via communication path 150 to storage modules 104. As generally known in the art, storage modules 104 may comprise individual disk drives or enclosures of multiple disk drives incorporating one or more power supplies and cooling systems. Such storage modules 104 may be coupled to storage controllers 102 by path 150 using any of several well-known, commercially available communication media and associated protocols including, for example, parallel SCSI, serial attached SCSI ("SAS"), Fibre Channel, and various other parallel bus and high speed serial communication architectures. Further, as generally known in the art, path 150 may represent multiple redundant communication paths to further improve reliability of communications between a storage controller 102 and associated storage modules 104.

Storage controller 102 may include an I/O request processor 106. In general, I/O request processor 106 may include a general or special purpose CPU 101 with associated program memory for controlling overall operation of the storage controller. Back-end interface 110 within I/O request processor 106 provides interface features to couple the storage controller 102 via communication path 150 to attached storage modules 104. Front-end interface 108 within I/O request processor 106 provides front-end interface capabilities to couple storage controller 102 to one or more attached host systems 120. I/O request processor 106 generally includes high speed DMA (direct memory access) capabilities to permit rapid transfer of information between the various components of I/O processor 106 and between the elements of I/O processor 106 and an associated local cache memory 112. Path 152 represents typical local DMA capabilities wherein back-end interface 110 may utilize DMA features to transfer data between local cache memory 112 and storage modules 104. In like manner, front-end interface 108 may use local DMA features to transfer the information between local cache memory 112 and attached host systems 120.

Storage controller 102 may also include inter-controller interface element 114 to provide a dedicated communication path between multiple storage controllers 102. The front-end communication path, the back-end communication path and the inter-controller communication path are preferably separate and distinct communication paths. As noted above, such a dedicated communication path may be applied for cache coherency information exchanges, I/O request processing information exchanges, and any other inter-controller exchanges useful for high performance I/O request processing distributed among the plurality of storage controllers 102.

Storage controller 102 is therefore adapted to permit local processing of received I/O requests through operation of I/O request processor 106 utilizing local DMA features via path 152 to exchange information between attached host systems 120 and local cache memory 112 and/or between storage modules 104 and local cache memory 112. Storage controller 102 is also adapted to utilize inter-controller interface 114 to exchange information with other storage controllers in a clustered storage environment. As noted above and as discussed further herein below, inter-controller interface 114 provides a remote DMA ("RDMA") interface between elements of storage controller 102 and elements of other similar controllers within a storage cluster environment.

By contrast with current storage controller architectures, storage controller 102 of FIG. 1a is easily scaled from a stand-alone storage system having a single storage controller to a complex storage cluster environment having multiple storage controllers coupled together through their respective inter-controller interface elements 114. The scaling of the system may be flexibly scaled from a single, stand-alone storage controller to a redundant pair of controllers or to multiple pairs of controllers where a dedicated mirroring channel may still be used for cache mirroring. The dedicated channel used for mirroring may also be used for other inter-controller communication and/or another fabric interface may be used for such other inter-controller k communication. Further, the controller may scale to a larger topology by using the fabric interface for cache mirroring and for other inter-controller communications.

Thus a storage system in accordance with features and aspects hereof may scale up in pairs or may scale up incrementally such that mirroring and redundancy pairing may be configured dynamically among the plurality of controllers in the scaled up store system. The flexible scaling features hereof using a fabric connection among all controllers also enhance performance of the scaled up system by allowing dynamic adjustment of I/O processing loads since any controller may mirror operations of another. In such an environment, a feature hereof provides that the inter-controller coupling utilizes RDMA capabilities for each controller to access components of another controller coupled through the inter-controller communication paths.

Figure 1B:
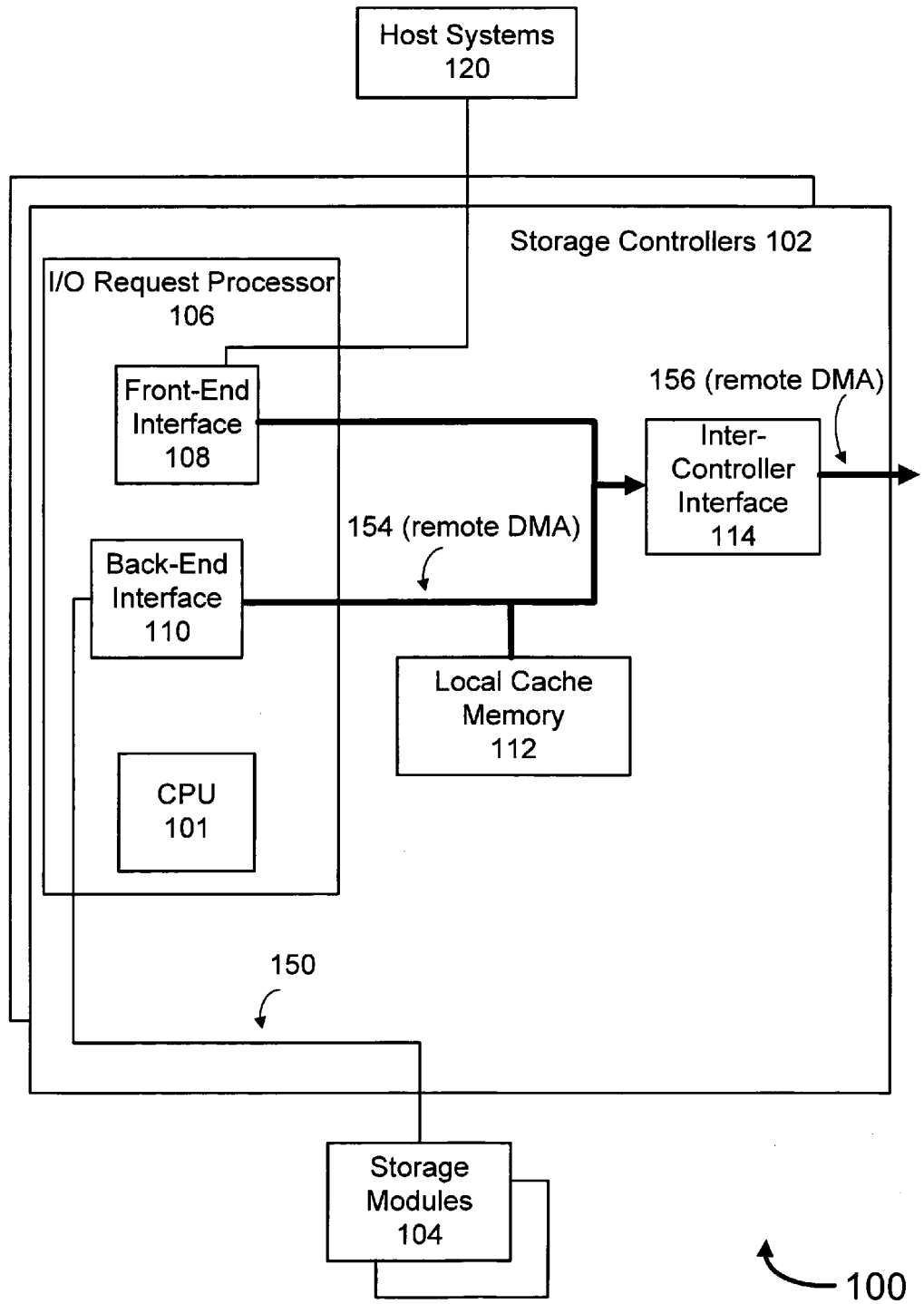

FIG. 1b shows the same storage controller architecture of FIG. 1 but highlights communication paths 154 and 156 that provide remote DMA capabilities from I/O request processor 106 through the inter-controller interface 114 to other storage controllers via path 156. Utilizing these RDMA communication paths and inter-controller interface 114, I/O request processor 106 may transfer information from its local cache memory to elements within another storage controller through inter-controller interface 114 and communication path 156. In like manner, I/O request processor 106 may utilize RDMA features to transfer information directly from front-end interface 108 or back-end interface 110 through interface controller 114 and communication path 156 to elements within other storage controllers. In effect, the I/O devices (front-end interface 108 and back-end interface 110) and local cache memory 112 of each of multiple storage controllers 102 may be directly accessed by any other storage controller in a cluster storage environment utilizing inter-controller interface 114 of each of the storage controllers 102. Thus, system 100 of FIGS. 1a and 1b may be easily and flexibly scaled from a single controller architecture through any number of storage controllers. RDMA features and aspects hereof permit each controller to access I/O devices and local cache memory of any other storage controller in the cluster configuration.

To enable use of RDMA features, the plurality of controllers maintain memory maps such that each controller may access cache memory and/or I/O interface devices of any other controller through the inter-controller fabric communication links. In one aspect, a master memory map may be created (i.e., at system initialization or as a function of initial configuration of he system). Such a common shared memory map is then used by each of the plurality of storage controllers and may be maintained as updates are required by exchanging update messages among the controllers. In another aspect, each storage controller may construct its own memory map to map to memory and I/O devices of each other controller that it may access.

Those of ordinary skill in the art will recognize a wide variety of communication media and protocols useful for the inter-controller interface 114 to couple such a plurality of storage controllers 102. For example, a simple PCI Express bus providing RDMA capabilities may be useful for coupling a small number of storage controllers in a small cluster environment. Or, for example, high speed serial communication protocols and media such as InfiniBand may be useful for inexpensively coupling a larger number of storage controllers in a larger, more complex storage cluster environment. Still further, those of ordinary skill in the art will recognize that a storage controller 102 may incorporate multiple such communication features within inter-controller interface 114. For example, inter-controller interface 114 may include both a PCI Express bus interface and an InfiniBand interface to permit flexible reconfiguration of the storage controller for a very small cluster storage environment or a larger, complex storage cluster environment.

As noted above, a storage controller in accordance with features and aspects hereof may utilize a single communication link for both mirrored cache information exchange as well as for other inter-controller communication. Either a dedicated, point to point communication channel such as a cache mirror channel may be used for both purposes or a switched fabric channel may be used for both communication purposes. To further enhance performance, a plurality of storage controllers in accordance with features and aspects hereof may use both a mirrored cache communication channel for mirrored cache information exchanges and a switched fabric communication link for exchange of other inter-controller information.

Figure 1C:
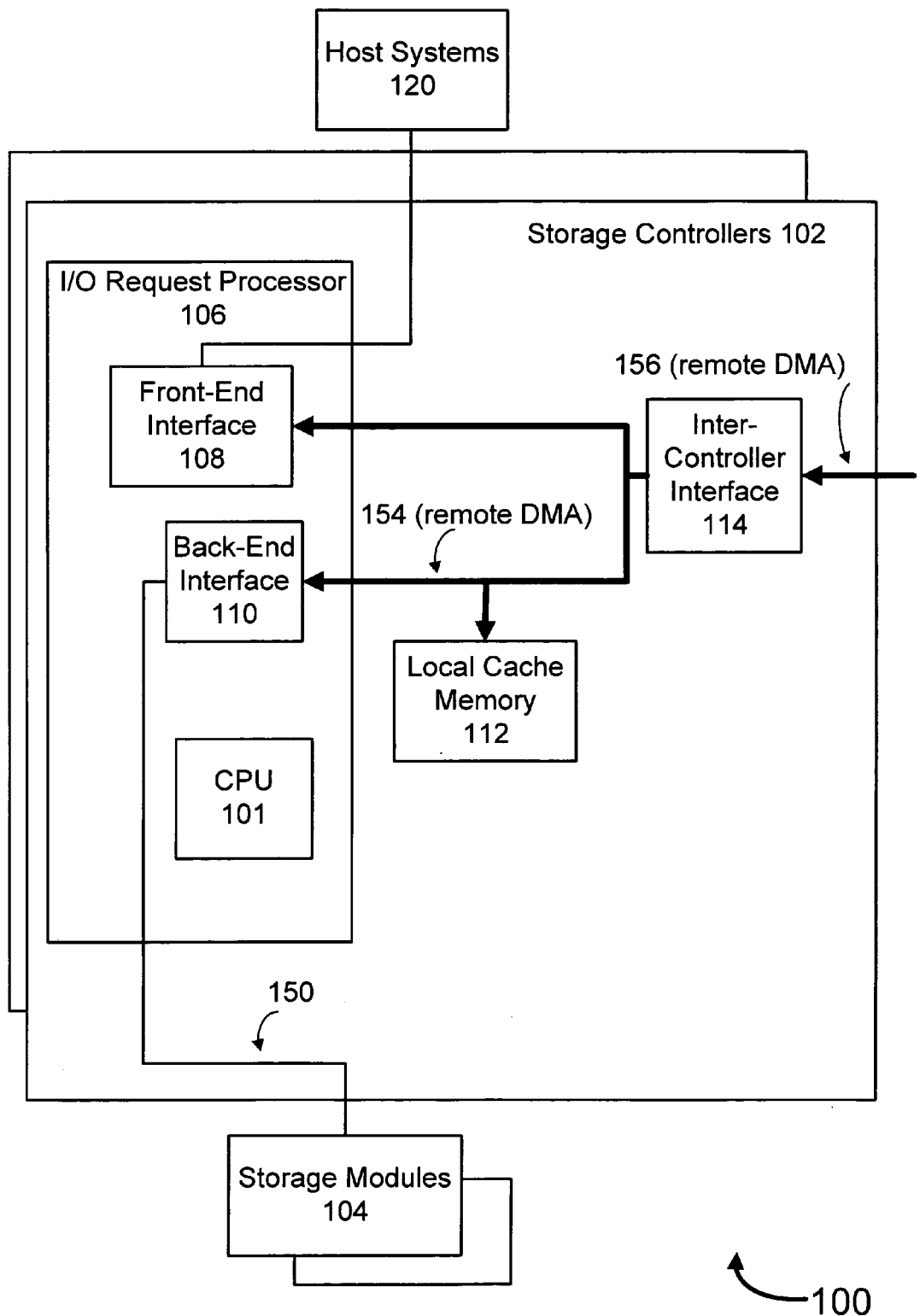

FIG. 1c shows yet another usage of the communication paths utilized in storage controller 102 in accordance with features and aspects hereof. Another storage controller may access the I/O devices and local cache memory of the depicted storage controller 102 using RDMA capabilities. An external storage controller (not shown) may utilize RDMA capabilities via path 156 through inter-controller interface 114 to access front-end interface 108, back-end interface 110, and local cache memory 112 of the depicted storage controller 102. As noted above, such RDMA capabilities allow the external storage controller (not shown) to easily manage cache coherency between its local cache memory and the local cache memory 112 of the depicted storage controller 102. RDMA capabilities allow an external storage controller to directly access front-end interface 108 and back-end interface 110 (thereby permitting access to storage modules 104 coupled through back-end interface 110). Thus, the external storage controller may process I/O requests utilizing the I/O devices, local cache memory, and storage modules associated with the depicted storage controller 102.

Those of ordinary skill in the art will readily recognize that the storage controller 102 of FIGS. 1a through 1c are intended merely as exemplary of one possible implementation of features and aspects hereof. Numerous additional components and features for a fully functional storage controller will be readily apparent to those of ordinary skill and the art. Further, those of ordinary skill in the art will readily recognize that a variety of levels of integration or further separation of components within a storage controller may be selected as a matter of design choice. For example, the general or special purpose processing features of the depicted CPU 101 of storage controller 102 may be integrated within a single integrated circuit with the front-end and back-end interface elements 108 and 110 as well as associated program memory. Such matters of design choice are well known to those of ordinary skill in the art.

Figure 2:
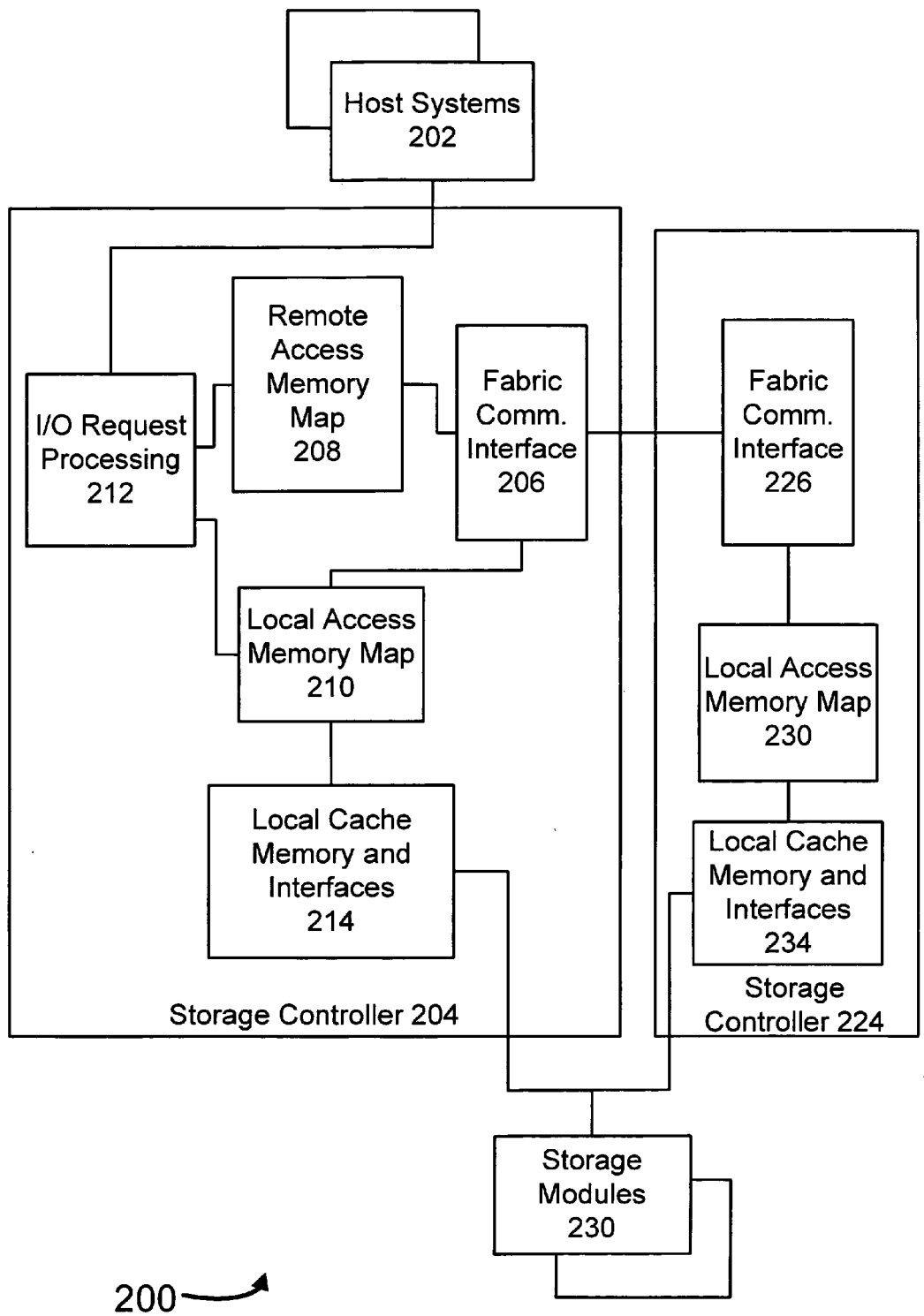
FIG. 2 is a block diagram of another exemplary system including a storage controller in accordance with features and aspects hereof to allow flexible scaling of controller through a dedicated inter-controller interface.

FIG. 2 shows a system 200 depicting other features and aspects hereof wherein multiple storage controllers utilize RDMA capabilities to cooperatively process I/O requests. One or more host systems 202 are coupled to storage controller 204 to access to storage modules 230. As above, storage modules 230 may be individual disk drives or modules/enclosures housing multiple disk drives or other storage devices coupled along with associated common power supplies and cooling components—often in a redundant configuration for enhanced reliability and performance. Host systems 202 and storage modules 230 are coupled to storage controller 204 through appropriate I/O interfaces and associated communication paths and media. Exemplary of such interfaces and communication paths and media are Fibre Channel, serial attached SCSI ("SAS"), parallel SCSI, and other well-known parallel bus structures and high speed serial communication structures and protocols.

Storage controller 204 may include I/O request processing element 212 for receiving an I/O request from an attached host system 202 and processing the received requests by accessing identified storage locations in storage modules 230. I/O request processing element 212 may process received I/O requests by accessing information in local cache memory and interfaces 214 or by accessing local cache memory and interfaces 234 within another storage controller 224. To access local cache memory and interfaces 214 within the same storage controller 204, I/O request processing element 212 utilizes local access memory map 210 to address local cache memory and interfaces 214. The memory map may provide well known virtual memory addressing features to map a logical address to the local physical address of the desired cache memory or I/O device. Thus, an I/O request may be locally processed within storage controller 204 by directly accessing identified locations of storage modules 230 or of local cache memory.

Alternatively, storage controller 204 may process an I/O request by accessing local cache memory and interfaces 234 associated with another storage controller 224 in a clustered storage environment. Other storage controller 224 may be a redundant controller paired with storage controller 204 or may be any other controller in a clustered storage environment providing a plurality of storage controllers. Storage controller 204 and other storage controllers 224 may be coupled through respective fabric communication interfaces 206 and 226. Fabric communication interfaces 206 and 226 may provide, for example, PCI Express, InfiniBand, or other commercially available communication media and protocols that permit remote DMA ("RDMA") access therethrough. In order to access local cache memory and interfaces 234 on another storage controller 224, I/O request processing element 212 of storage controller 204 utilizes a remote access memory map 208 for purposes of generating RDMA operations through the fabric communication interface 206 destined for cache memory and interfaces 234 on another storage controller 224. Thus, storage controller 204 may perform processing for a received I/O request utilizing RDMA capabilities to access storage modules 230 through another storage controller 224. System 200 therefore provides flexible scalability for a storage subsystem including any number of storage controllers coupled in redundant pairs or coupled in any manner such that any controller may access cache memory an I/O interface devices of any other controller in the system using RDMA access.

Those of ordinary skill in the art will recognize that any number of storage controllers may be coupled in such a manner including, pair-wise coupling of redundant pairs or fabric oriented coupling of any number of storage controllers in the system. FIG. 2 is therefore intended merely as exemplary of one possible system configuration employing features and aspects hereof to permit flexible reconfiguration of any number of storage controllers in the system 200.

Figure 5:
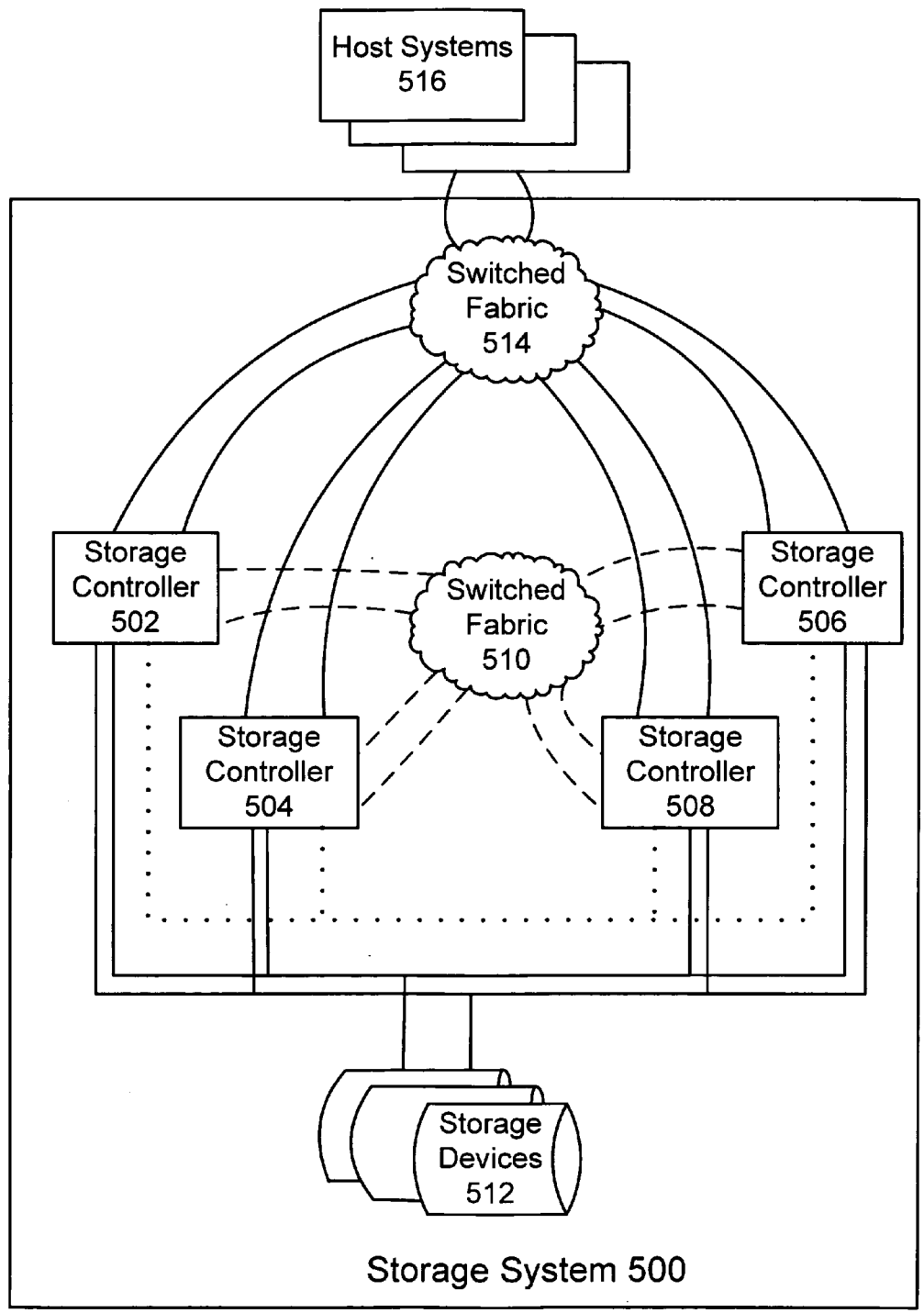
FIG. 5 is a block diagram of an exemplary storage system scaled to a large scale subsystem using a fabric connection among the plurality of storage controllers in accordance with features and aspects hereof.

FIG. 5 shows an exemplary storage system 500 scaled up to four controllers (502, 504, 506, and 508) using a switched fabric 510 for inter-controller communication (including cache mirroring exchanges as well). A second switched fabric 514 may couple the controllers to one or more host systems 516. Thus any host system 516 may communicate to the storage system 500 through any of the storage controllers 502 . . . 508 to transmit I/O requests and to receive results including requested data. The controllers 502 . . . 508 may exchange information, including RDMA transfers of information, via switched fabric 510 through the heavier dashed line communication paths of FIG. 5. Thus any controller 502 . . . 508 may serve as a redundant backup for any other controller. Further, any controller may access cache memory and/or I/O devices of any other controller using RDMA transfers through the switched fabric 510. In addition, or in the alternative, a heavier dotted line in FIG. 5 represents a cache mirroring communication channel. Such a mirrored cache communication channel may be used exclusively for exchange of mirroring information among the redundant controllers while the inter-controller communication may be directed through the switched fabric 510. Such a configuration enhances performance by segregating all controller interaction while reducing cost and complexity of each controller. Thus a single, simple controller design may be used to scale from a single storage controller in a storage system up to any number of controllers exchanging control information and exchanging mirrored cache information.

The switched fabric 410 may be, as noted herein, an InfiniBand fabric as well as numerous other high speed serial communication protocols and media. Further, current proposals to advance the design of the PCI Express bus architecture may extend this communication medium to allow switched fabric architecture communications. In particular, the "advanced switching interconnect" special interest group has begun work as an industry standards organization to define such a switched fabric-like extension to the PCI Express structures and protocols. Those of ordinary skill in the art will be aware of such developing proposals and information regarding such developments is readily available at www.asi-sig.org.

Still further, the enhanced architectures diagramed in FIGS. 1a . . . 1c, 2, and 5 may be operated in accordance with a variety of modes of operation to perform received I/O requests. The architecture permits I/O requests to be performed using "I/O shipping" techniques well known to those of ordinary wherein a first storage controller receives an I/O request from an attached host and transfers ("ships") the request to another storage controller for further processing. In preferred modes of operation and in accordance with features and aspects hereof, a first control may receive an I/O operation. The first controller may process the I/O request locally by accessing cache memory and I/O interfaces to storage devices local to that first controller. In addition, the first controller may utilize RDMA capabilities of the controller in accordance with features and aspects hereof to access cache memory and/or I/O interfaces of another storage controller in a cluster coupled through a fabric connection to the first controller. In yet another alternative preferred mode of operation, a first controller may receive an I/O request but may "ship" the request to another controller (e.g., to balance processing loads among the various storage controllers in a cluster environment). The second controller may then process the I/O request by using RDMA techniques through a fabric connection to the other controllers. In particular, the second controller may use RDMA features and aspects hereof to access the cache memory and/or I/O interface devices of he first controller—i.e., the controller that shipped the request to this second controller.

In effect, in a clustered storage subsystem where all controllers are coupled through a switched fabric interface, the processor of any of the storage controller may access remote cache memory and I/O interface devices of other controller in essentially he same way that it may access its own local cache memory and I/O interface devices. Thus features and aspects hereof provide improved flexibility in the configuration of clustered storage systems and improvements in performance of such a clustered storage system. Further, these benefits are achieved in a scalable controller design that may easily and inexpensively be scaled from a single, stand-alone storage controller to a large clustered storage system coupling any number of storage controllers.

In typical operation of clustered, scalable controllers in accordance with features and aspects hereof, DMA scatter/gather lists ("S/G lists") are passed from a first controller to a second controller to provide local memory addresses within the first controller's cache memory for a second controller to access using RDMA features. In a read operation, the S/G list may represent locations in the first controller's cache memory where data read from storage device may be stored for eventual return to a requesting host system. Or, the S/G list entries in a read operation may represent locations in the local cache memory where requested data is already stored such that the second controller may return the data to the requesting host system. In like manner, when performing a write operation, the S/G list may indicate local cache memory locations in a first controller that a second controller may access to record the data on the storage devices.

Figure 3:
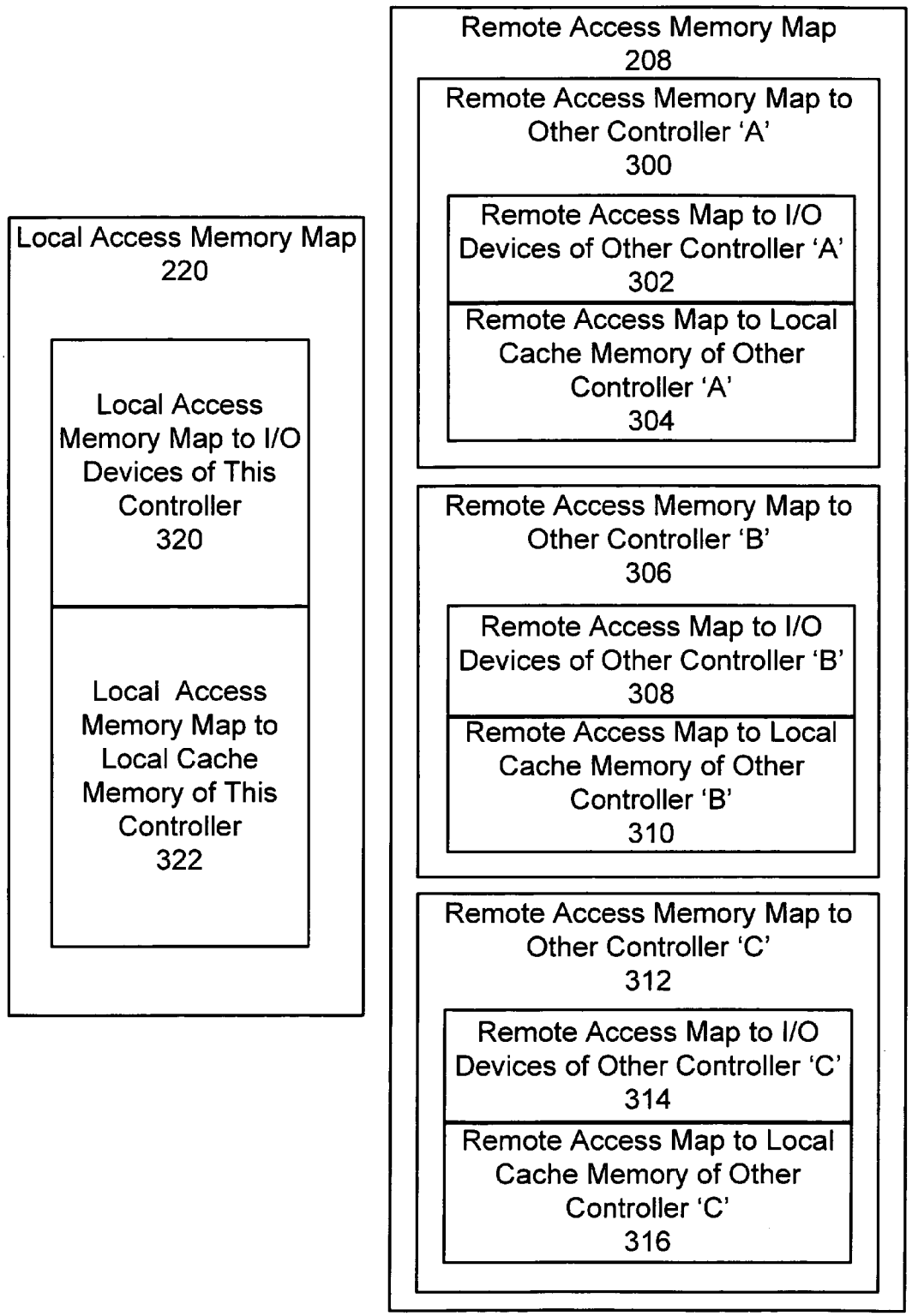
FIG. 3 is a block diagram of an exemplary local access memory map and an exemplary remote access memory map as noted in FIG. 2 in accordance with features and aspects hereof.

FIG. 3 provides additional details of exemplary memory maps utilized by system 200 of FIG. 2 for accessing either local cache memory an I/O interfaces within the same storage controller or for accessing cache memory an I/O interface controllers of any other storage controller in a clustered storage system. Local memory map 210 is used by the I/O request processor of a storage controller to gain access to the locally memory mapped I/O devices and local cache memory of the storage controller that received the I/O request. A first portion 320 of the local access memory map 210 maps logical memory addresses to I/O devices of this controller. This first portion 320 is used by the I/O request processor to access, for example, front-end interface elements and back-end interface elements for exchanging information with the attached host systems and attached storage modules, respectively. A second portion 322 of local access memory map 210 maps logical memory addresses to the local cache memory of this controller. The I/O request processor of this controller uses these mapped memory addresses for accessing information in the local cache memory of this controller.

By contrast, remote access memory mapped 208 is used by the I/O request processor of a controller to access I/O devices and/or local cache memory of other controllers in the clustered storage system. The remote access memory map 208 may include a sub-map or portion associated with each other controller coupled to the controller containing the remote access map 208. A first portion 300 identifies memory mapping information for a first other controller "A" while the second and third controller "B" and "C", respectively, have corresponding other portions 306 and 312, respectively. Within each portion associated with a corresponding other controller, a first portion 302 of the remote map identifies logical memory addresses to be used by the current controller to access I/O devices in the other controller "A". A second portion 304 identifies memory addresses to be used by the current storage controller to access local cache memory of the other controller "A". In like manner, portion 306 for controller "B" includes a first portion 308 for mapping I/O devices of controller "B" and a second portion 310 for mapping local cache memory of other controller "B". Similarly, portion 312 includes a first portion 314 for mapping addresses used by the current controller to access I/O devices of other controller "C" and a second portion 316 to access local cache memory of other controller "C".

The current controller therefore uses the local access memory map 210 when processing an I/O request local within that controller. I/O devices and local cache memory are accessed by corresponding logical addresses identified in the respective portions 320 and 322 of local access memory map 210. The current controller may also process an I/O request by accessing local cache memory and/or I/O devices corresponding with another controller coupled to the current controller. When so processing an I/O request, the current controller uses the appropriate portion of the remote access memory mapped 208 corresponding to the particular other controller and the particular devices and/or local cache memory to be accessed.

Those of ordinary skill in the art will readily recognize numerous detailed structures and alternative structures for representing the memory mapped features shown in FIG. 3. In addition, memory management features associated with various general and special purpose processors may provide for specific register structures and memory structures (e.g., within associated memory controller circuits or chips) for retaining the mapping information associated with the local I/O devices and local cache memory and the I/O devices an cache memory associated with other controllers coupled to the current controller. As noted above, the current controller preferably uses RDMA capabilities to simplify access to the remote devices and cache memory associated with other storage controllers coupled to the current controller.

Figure 4:
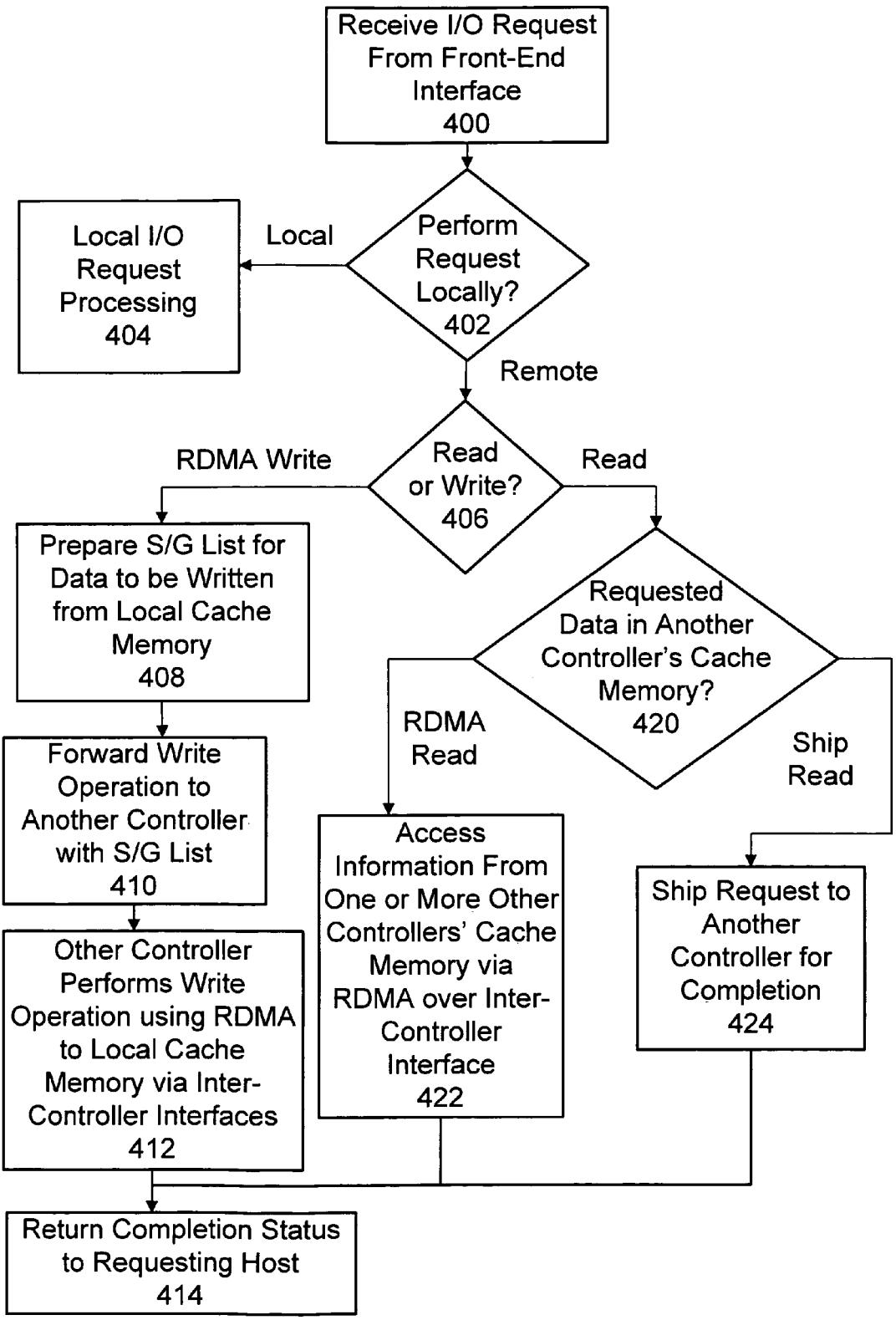
FIG. 4 is a flowchart describing an exemplary method for processing an I/O request in accordance with features and aspects hereof.

FIG. 4 is a flowchart describing a method in accordance with features and aspects hereof operable within a storage controller in a storage cluster including multiple storage controllers coupled through a switched fabric inter-controller communication medium. As noted above, when scaled up to such a cluster configuration, a switched fabric communication path may be utilized to distribute processing of I/O requests among the plurality of storage controllers utilizing RDMA capabilities. Element 400 of FIG. 4 is first operable to receive an I/O request from an attached host system through a front-end interface of this storage controller. Element 402 is then operable to determine whether the received I/O request is preferably performed locally utilizing local I/O interfaces (e.g., back-end interfaces to the storage devices) and local cache memory of this storage controller (the controller in receipt of the I/O request). Any number of factors well known to those of ordinary skill in the art may be involved in such a determination. Simple load balancing factors may be involved in a decision to perform the received I/O request locally or to perform the I/O request using capabilities of other remote storage controllers in the storage cluster. Still further, the decision to perform an I/O request locally may be made in accordance with a determination that requested information to be access by the I/O request is more readily available in the local cache memory of this storage controller. Or the request may preferably be processed by this controller if the eventual destination storage devices associated with the I/O request are more easily accessible through this storage controller. Those of ordinary skill in the art will readily recognize numerous factors to be considered in such a decision to process the I/O request totally locally. Where the decision is made to perform the I/O request utilizing exclusively local processing capabilities, element 404 represents normal I/O processing within the storage controller to complete the I/O request. Such normal processing generally entails utilization of local cache memory within this storage controller and access to storage devices through the back-end interface elements of this storage controller.

Where another storage controller is better suited for any reason to perform the received I/O request or to aid in completing the request, element 406 is then operable to determine whether the received request is for a write operation or for a read operation. If the request is for a write operation, element 408 is next operable to prepare an appropriate scatter/gather list for the received data to be read in from the local cache memory of this storage controller and written to appropriate storage devices. As noted above, the information required to perform an I/O request on another controller may preferably be provided to the other controller in the form of a scatter/gather list indicating addresses in the local cache memory of this first storage controller where the data may be accessed. Element 410 is operable to forward the write operation to another controller along with the constructed scatter/gather list. Element 412 then represents processing by the a selected other controller to perform the indicated write operation using the scatter/gather list and using RDMA capabilities to access the write data from the local cache memory of this storage controller. As noted above, such RDMA capabilities may be performed utilizing the inter-controller interface through a switched fabric communication structure. Lastly, element 414 is operable to return an appropriate completion status to the requesting host system to thereby complete the received I/O operation.

Where element 406 determines of that the received I/O request is for a read operation, element 420 is next operable to determine whether the requested data is resident in the cache memory one or more other storage controllers in the storage cluster. Distributed cache management techniques utilizing the inter-controller switched fabric communication features and aspects hereof may readily determine that requested data resides in the cache memory local to another storage controller in the storage cluster. If element 420 determines that the requested data is so resident in the cache memory of another controller, element 422 is operable to access the requested information from one or more other controllers. RDMA capabilities are used to access the requested information from the cache memory of another controller using the inter-controller switched fabric communication features and aspects hereof.

Those of ordinary skill in the art will recognize that the information to be accessed may be received utilizing RDMA from this controller to access the cache memory of one or more other controllers in the storage cluster. Similarly, those of ordinary skill in the art will recognize that the requested information may also be first copied to the local cache memory of this storage controller from the cache memory of another storage controller and then returned to the requesting host system. In such an operation, a scatter/gather list may be prepared and forwarded to the other controllers in which the requested memory requested information is resident in the cache memory. The other controller may then utilize RDMA capabilities to transfer the requested data into the local cache memory of this storage controller utilizing the inter-controller switched fabric communication features and aspects hereof. Numerous other equivalent transfers will be readily apparent to those of ordinary skill in the art utilizing switched fabric communications features and aspects hereof and RDMA capabilities over such a switched fabric communication path. Lastly, element 414 is operable as discussed above to complete the I/O request by return of an appropriate completion status to the requesting host system along with any requested read data.

If element 420 determines that the requested data is not resident in the cache memory of any storage controller of the storage cluster, element 424 is operable to "ship" the I/O request to another controller that may more readily access the information from associated storage devices. As generally known in the art, the storage devices may be partitioned such that particular storage controllers have access to particular storage devices or regions of particular storage devices. Thus, the I/O request may be more easily performed by a storage controller that has direct access to the appropriate storage devices containing the requested information. Element 424 therefore ships the I/O request to an appropriate other controller and may await completion of that request. Element 414 then returns an appropriate completion status along with requested information to the requesting host system. In the alternative, the controller to which the I/O request was shipped may directly communicate with the requesting host system to complete the I/O read operation. In such a context, this controller may continue operation without awaiting completion of the shipped I/O request.

The flowchart of FIG. 4 is intended merely as exemplary of one method in accordance with features and aspects hereof to utilize the cluster of storage controllers coupled through and inter-controller switched fabric communication medium. Where such a controller is scaled up to a large storage cluster, the method of FIG. 4 allows for exchange of information among the clustered storage controllers such that any of the storage controllers may complete the I/O request utilizing the switched fabric communication medium and RDMA capabilities thereon to optimally complete the requested I/O operation. The same controller structure when scaled down to a single controller architecture or a simple dual redundant pair of controllers may perform all I/O operations locally or through simple mirrored operation with its redundant paired controller. Thus the structures and methods in accordance with features and aspects hereof may easily scale from a single storage controller context to a larger clustered storage controller context where the cluster of storage controllers communicate through the switched fabric communication medium.

Those of ordinary skill and the art will recognize a variety of equivalent methods and detailed processing for completing processing of a received I/O request within a storage controller coupled to one or more other controllers in a storage cluster environment. FIG. 4 is therefore merely intended as representative of one possible embodiment of such a processing method.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. In particular, those of ordinary skill in the art will readily recognize that features and aspects hereof may be implemented equivalently in electronic circuits or as suitably programmed instructions of a general or special purpose processor. Such equivalency of circuit and programming designs is well known to those skilled in the art as a matter of design choice. As a result, the invention is not limited to the specific examples and illustrations discussed above, but only by the following claims and their equivalents.

What is claimed is:

1. An apparatus within a storage controller for communication among a plurality of storage controllers in a clustered storage system, the apparatus comprising:
   a local memory mapped interface for access to local cache memory of the storage controller by other components within the storage controller;
   a fabric communication interface for inter-controller communication between the storage controllers and other storage controllers of the plurality of storage controllers; and
   a remote memory mapped interface for access to the local cache memory of the storage controller by the other storage controllers,
   wherein the fabric communication interface is adapted to permit remote DMA ("RDMA") access by the storage controller to local cache memories of the other storage controllers and is further adapted to permit RDMA access to the local cache memory of the storage controller by the other storage controllers.

2. The apparatus of claim 1 wherein the local memory mapped interface includes:
   a map portion corresponding to each of the other storage controllers to permit access by the storage controller to the local cache memory of each of the other storage controllers.

3. The apparatus of claim 2 wherein each map portion further includes:
   an I/O map portion corresponding to one or more I/O devices of the corresponding other storage controller to permit RDMA access by the storage controller to the one or more I/O devices of the corresponding other storage controller.

4. The apparatus of claim 1 wherein the remote memory mapped interface further includes:
   an I/O map portion corresponding to one or more I/O devices of the storage controller to permit RDMA access by any of the other storage controllers to the one or more I/O devices of the storage controller.

5. The apparatus of claim 1 wherein the storage controller performs I/O requests by accessing information from the other storage controllers using the fabric communication interface.

6. The apparatus of claim 1 wherein the storage controller maintains cache coherency of local cache memories associated with each of the plurality of storage controllers by exchanging cache coherency information using the fabric communication interface.

7. A system comprising:
   a plurality of storage modules;
   a plurality of storage controllers each adapted for coupling to one or more of the plurality of storage modules and each adapted for coupling to one or more host systems; and
   an inter-controller communication medium coupling the plurality of storage controllers to one another,
   wherein each storage controller includes:
   local cache memory;
   a back-end interface for coupling the storage controller to the one or more storage modules;
   a front-end interface for coupling the storage controller to the one or more host systems; and
   an inter-controller interface for coupling the storage controller to one or more other storage controllers of the system through the inter-controller communication medium, wherein the inter-controller interface permits remote DMA ("RDMA") access between the storage controller and the local cache memory of the one or more other storage controllers and permits RDMA access to local cache memory of the storage controller by the one or more other storage controllers.

8. The system of claim 7 wherein the inter-controller communication medium further comprises a parallel bus structure.

9. The system of claim 8 wherein the parallel bus structure is a PCI Express bus structure.

10. The system of claim 7 wherein the inter-controller communication medium further comprises a fabric communication medium.

11. The system of claim 10 wherein the fabric communication medium is an InfiniBand communication medium.

12. The system of claim 7 wherein each storage controller further comprises:
    a first memory map that maps physical addresses within the storage controller for access to the local cache memory, to the back-end interface, and to the front-end interface; and
    a second memory map that maps physical addresses within the storage controller for RDMA access to local cache memory of the one or more other storage controllers, to front-end interfaces of the one or more other storage controllers, and to the back-end interface of the one or more other storage controllers, wherein each storage controller may access the local cache memory, front-end interface, and back-end interface of any storage controller of the plurality of storage controller.

13. The system of claim 7 wherein each storage controller is adapted to perform I/O requests received from one or more host systems by accessing information on the other storage controllers using the inter-controller interface.

14. The system of claim 7 wherein each storage controller is adapted to maintain cache coherency of local cache memories associated with each of the plurality of storage controllers by exchanging cache coherency information using the inter-controller interface and the inter-controller communication medium.

15. A method operable in a storage controller of a storage system having a plurality of storage controllers, the method comprising:
    receiving an I/O request from a host system via a first communication medium coupling the storage controller to one or more host systems;
    responsive to receipt of the I/O request, accessing information in one or more other storage controllers of the plurality of storage controllers using remote DMA ("RDMA") via a second communication medium coupling the plurality of storage controllers to one another; and responsive to receipt of the I/O request, accessing information on one or more storage modules via a third communication medium coupling the storage controller to the one or more storage modules.

16. The method of claim 15 wherein each of the plurality of storage controllers includes a local cache memory and wherein the method further comprises:

maintaining coherency of the local cache memory of the storage controller and the local cache memories of the other storage controllers by exchanging cache coherency information between the storage controller and the other storage controllers via the second communication medium.

* * * * *